MODIFYING THE TERMINATIONS OF ELECTRICAL COMPONENTS

Filed April 9, 1957

INVENTORS H. J. BRAUN
R. F. MALLINA
R. W. McKENZIE
BY John C. Morris
ATTORNEY

United States Patent Office 3,054,165

Patented Sept. 18, 1962

3,054,165

MODIFYING THE TERMINATIONS OF ELECTRICAL COMPONENTS

Herbert J. Braun, Bridgewater Township, Somerset County, N.J., and Rudolph F. Mallina, Hastings on Hudson, and Roger W. McKenzie, Long Island City, N.Y., assignors to Bell Telephone Laboratories, Incorporated, New York, N.Y., a corporation of New York Filed Apr. 9, 1957, Ser. No. 651,678
4 Claims. (Cl. 29—155.55)

Figures 1, 2, 3:
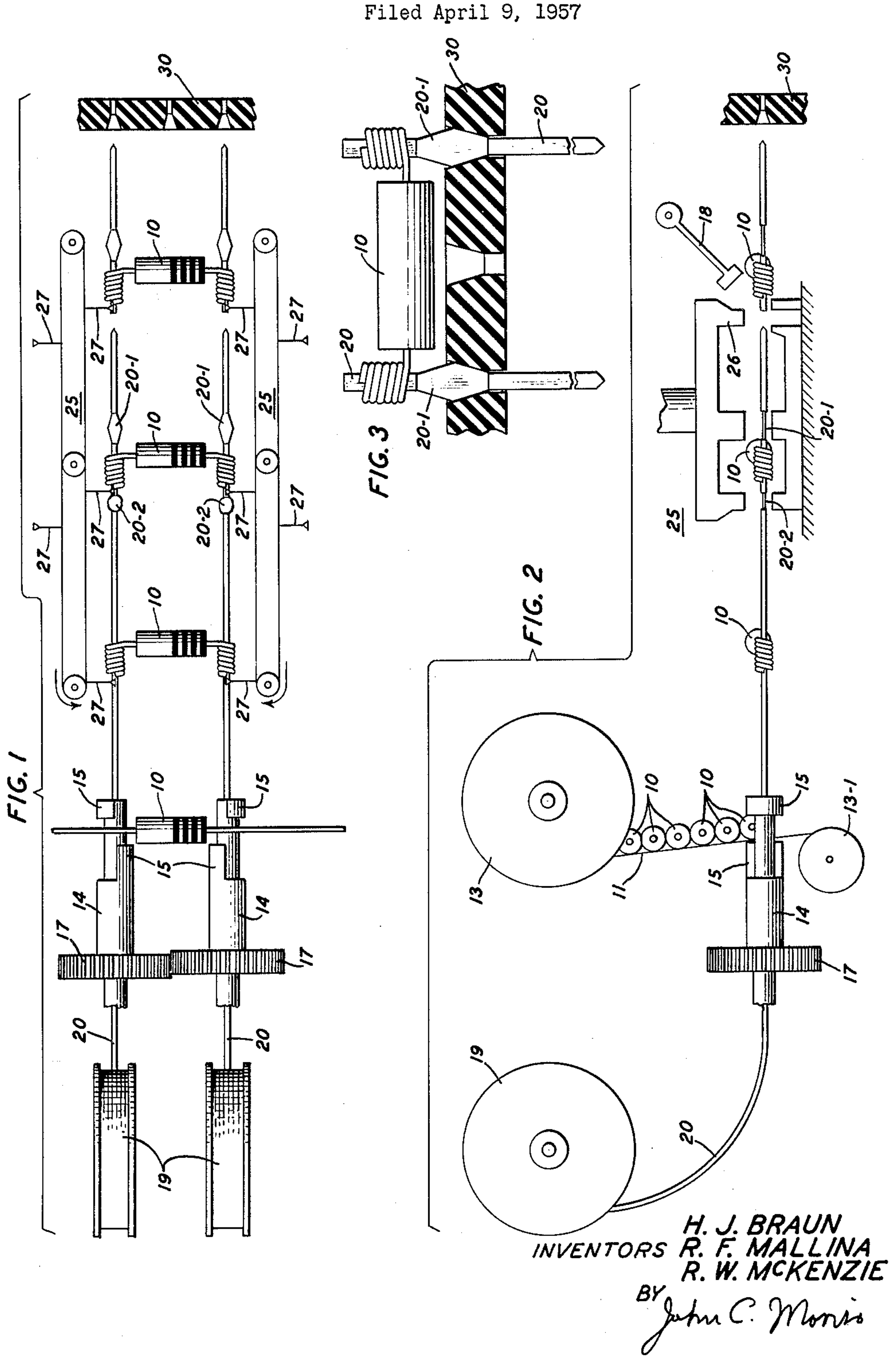

This invention relates to electrical components and more particularly to modifying the terminations thereof so that the components can be easily mounted in supporting assemblies in a mechanically secure manner.

Great progress has been made in recent years in the design and automatic manufacture of electrical components and assemblies. During this period, an entirely new wire attaching technique has been developed. This new technique is the wire-wrap method of making solderless electrical connections; the method produces connections of the type fully described in Patent 2,759,166, R. F. Mallina, August 14, 1956.

Furthermore, in recent years considerable thought has been given to the concept of a modular method of component design and assembly, in preference to the arbitrary spacing of assembly tie points. A modular mounting board or panel can be punched or molded with regularly spaced holes which are separated in both directions by the chosen dimension or module. Thus, it is not necessary to fabricate a board to meet the specific requirements of every special design, for a modular board is adaptable to a great variety of assembly layouts.

The wire-wrapping method and the technique of modular design can be combined to attain highly automatic, reliable, flexible and inexpensive assembling processes. The use of conventional and commercially available axial lead or pigtail components in such processes is not, however, generally feasible because the leads of such components are not usually of sufficient thickness and rigidity to permit secure mechanical mounting of the leads directly in the modular boards. Additionally, the leads of such components are usually not designed to serve as terminal members onto which wire-wrapped connections can be directly made.

An object of the present invention is to facilitate the use of conventional electrical components in automatic manufacturing processes by modifying them to a form suitable for employment in such processes.

More specifically, an object of this invention is to modify the terminations of a component so that the component can be mounted in a mechanically secure manner in a panel member and so that the component terminations provide portions onto which wire-wrapped connections can be made.

These and other objects of the present invention are achieved by placing the leads of an axial lead or pigtail electrical component in the gripping members of a pair of wire-wrapping tools. Continuous strips of terminal material having chamfered ends and one or more longitudinal edges are then fed from supply reels through longitudinal openings in the tools. The chamfered ends of the strips are positioned so as to project a preassigned distance beyond the front or wrapping end of the tools. The component leads are then wire-wrapped onto the projecting portions of the terminal material so as to produce a ladder-type structure. At the completion of the wire-wrapping step, the terminal material is advanced in a forward direction so as to place the component secured thereto between forming and cutting tools. The forming tools form tapers in the material and, also, shape flattened regions therein on the supply reel side of the tapers.

The terminal material is then again advanced, thereby carrying a wire-wrapped component to the cutting tool. The cutting tool engages the aforementioned flattened regions and cuts through them so as to cut free terminal portions or stakes from the continuous strips. Cutting elements of the cutting tool are shaped so as to form square back ends on the stakes and chamfers on the forward ends of the following continuous strips.

The terminals or stake members, which are connected to the leads of a component in a mechanically secure and electrically stable manner, are then guided into the modular panel member. The chamfered terminal ends move easily into the panel until the tapered portions stop their forward motion. At that point a hammer-type element strikes the squared-off stake ends and drives the tapered terminal portions into the panel, thereby securely mounting the modified component in the panel.

The method of the present invention is advantageously practiced as a continuous one, i.e., while a wire-wrapped component is moved along to undergo forming, cutting, and inserting in a panel, other components are wire-wrapped onto the periodically advancing terminal strips so as to form a multirunged ladder structure.

Accordingly, a feature of the present invention is a method of mounting axial lead components in a panel member comprising the steps of wire-wrapping the component leads onto terminal stake members, and then driving the stake members into a panel member, whereby the component is securely mounted in the panel, the component being positioned on one side of the panel and the stake members extending therethrough and providing portions on the other side thereof to which wire-wrapped connections can be made.

Another feature of this invention is an electrical component comprising a body portion having a plurality of leads extending therefrom, and a like plurality of terminal stake members having tapered portions intermediate their ends, each of the stake members having one of the leads wire-wrapped thereon, whereby the electrical component can be inserted and mounted in a panel element by means of the stake members, the tapered portions of the members being adapted to engage the panel element securely.

A further feature of the present invention is a method of mounting axial lead components comprising the steps of wire-wrapping the leads of a component onto stake members, shaping portions of the stake members so as to form tapered intermediate regions and chamfered end regions, and driving the stake members, chamfered ends first, through a panel so as to wedge the tapered regions securely therein.

Thus, in accordance with aspects of this invention, an electrical component is modified to a form suitable for automatic insertion and mounting in a panel member. Furthermore, the modified terminations of the mounted component provide portions onto which wire-wrapped connections may be made so as to connect thereby the secured component to other points of the panel assembly.

A complete understanding of the invention and of these and other features and advantages thereof may be gained from consideration of the following detailed description in conjunction with the accompanying drawing in which:

FIG. 1 is a plan view of apparatus that may advantageously be employed in realizing specific illustrative embodiments of the present invention;

FIG. 2 is an elevation view of some of the apparatus of FIG. 1 and of additional apparatus intended to be employed therewith; and FIG. 3 is an enlarged plan view of a component modified in accordance with the principles of this invention, the modified component being shown mounted in an apertured panel member, and the member being broken away to show the relationship between the mounted component and the member more clearly.

Referring now to FIGS. 1 and 2, there is shown the manner in which commercially available axial lead or pigtail components 10 may advantageously be modified for insertion in a modular panel member in a rapid and economical manner.

An adhesive carrier tape 11, carrying components 10 which are to have their leads modified, is stored on a suitable supply reel 13 and is led onto a supporting reel 13—1. The tape 11, which is positioned between wire-wrapping tools 14 of the open-gap loading type described in Patent 2,743,502, F. Reck, May 1, 1956, but without the cutting and insulation-skinning features thereof, feeds the leads of one of the components 10 carried thereon into gripping portions 15 of the wire-wrapping tools 14. Lead grippers, not shown, may advantageously be associated with the tools 14 for the purpose of securely holding the leads of a component during the wire-wrapping operation, thus minimizing the transmission of stresses to the body of a component during the wire-wrapping operation.

Each of the tools 14 may, for example, have a gear element 17 formed as a part thereof. The gears 17 are driven by another gear element, not shown, so as to rotate the tools 14 in opposite directions. This reverse-rotation arrangement allows both tools to be top loaded, i.e., both component leads can be inserted into the tops of the tools 14. The top and bottom tools 14 shown in FIG. 1 are, respectively, so-called right-hand and left-hand wire-wrapping tools.

Feeding from supply reels 19 and through longitudinal openings, not shown, in the wire-wrapping tools 14 are continuous strips 20 of terminal material, the ends of which are chamfered. The strips 20, which are advantageously either square or rectangular in cross section, are spaced apart a modular distance by the guiding action of the longitudinal openings in the tools 14.

A specific illustrative method of this invention includes detaching a component 10 from the carrier tape 11 and placing the leads thereof in the open tips or jaws of the wire-wrapping tools 14. The strips 20 are then fed from the supply reels 19 and through the tools, and the jaws 15 of the tools are closed, thus gripping and bending back the component leads. The tools 14 are then rotated, thereby wire-wrapping the component leads onto the strips 20. The one-rung component-strip ladder is then advanced by suitable means, such as, for example, a belt-driven transfer assembly 25 of a type having thereon a number of strip gripping members or fingers 27, to a forming and cutting die station 25 where portions of the terminal or stake strips 20 are flattened. The portions 20—1 are shaped so as to form flares or tapers. The tapered regions 20—1 may advantageously be serrated, either during the flattening step or in a separate forming operation.

The strips 20 are then again advanced by the intermittently driven transfer assembly 25 so as to arrange the flattened portions 20—2 in position for a cutting operation. A cutting tool 26 of the forming and cutting station 25 is employed to sever a component 10 and the stake members onto which it is wire-wrapped from the continuous strips by cutting through the portions 20—2 so as to form chamfered regions on the ends of the continuous strips and squared-off regions on the ends of the stakes that are severed from the strips 20.

The component and its attached stakes are then carried into proper registry with a panel member 30 by the gripping members 27 of the transfer assembly 25. The panel 30 is advantageously formed with a plurality of modularly spaced apertures therein, although non-apertured boards or panels 30 might equally well be employed. In the latter event, the chamfered regions serve to aid the transfer assembly 25 in directing the stakes into the panel at modular intervals.

A hammer element 18 may advantageously be employed to drive the component stakes through the panel and to insure that the flared portions 20—1 of the stakes engage the panel 30 in a mechanically secure manner.

If the panel is modularly apertured, the chamfered regions, and apertures of the configuration shown in FIGS. 1, 2 and 3, are well suited to facilitate the insertion of the stake members into the panel assembly.

FIG. 3 shows a component, modified in accordance with the principles of the present invention, mounted in a panel or supporting member 30. The tapers or flattened and flared regions, which are clearly shown in FIG. 3, insure a strong mechanical connection between the stakes and the panel. The flared regions are formed between the chamfered or forward stake ends and the stake portions onto which the leads of a component are wire-wrapped. The chamfered regions, besides facilitating the entry of the stakes into a panel member, facilitate the entry of the stakes into the terminal receiving openings of wire-wrapping tools. Such tools can advantageously be employed to wire-wrap conductors onto the stake portions which project from the componentless side of the board, the wire-wrapped conductors serving to connect the stakes or component terminations to other terminal points in the panel assembly.

Thus, in accordance with the specific above-described aspects of the present invention, a method is provided in which the leads of readily available components are combined with terminal stake members so as to make the components suitable for secure mounting in panel board members. Additionally, a mounted component, modified in accordance with the principles of this invention, provides portions onto which wire-wrapped connections can be directly made.

It is to be understood that the above-described arrangements are illustrative and not restrictive of the principles of this invention. Other arrangements may be devised by those skilled in the art without departing from the spirit and scope of the invention.

What is claimed is:

1. A method of modifying the leads of components and mounting the components on a panel comprising the steps of assembling a group of components, each having a plurality of leads, with a corresponding plurality of strips of terminal material so that each lead of each component is wrapped about a corresponding strip, forming the strips into a number of stake-like terminals so that each component is supported by a plurality of terminals, each terminal having a component's lead wrapped thereabout, and inserting the terminals into preassigned apertures in a panel.

2. A method of modifying the leads of components and mounting the components on a panel comprising the steps of assembling a group of components, each having a plurality of leads, with a corresponding plurality of strips of terminal material so that each lead of each component is wrapped about a corresponding strip, cutting the strips into a number of terminals so that each component is supported by a plurality of terminals, each terminal having a component's lead wrapped thereabout, forming each terminal member so that it has a chamfered end and a flared portion therein, and driving each terminal, chamfered end first, into a preassigned aperture in a panel so that its flared portion anchors the terminal to the panel.

3. A method of modifying the leads of components and mounting the components on a panel comprising the steps of continuously feeding a plurality of strips of terminal material through a like plurality of wire-wrapping tools, each strip being fed through a different one of said tools, feeding each component of a plurality of components to all of the tools so that each of the component's leads, being gripped by a separate tool, is wrapped about a portion of the strip associated with that tool, cutting the strips into a number of terminals so that each component is supported by a plurality of terminals, each terminal having a component's lead wrapped about an end portion thereof, forming each terminal so that the other end thereof is chamfered and a portion intermediate of said end portions is flared, and driving each terminal's chamfered end through a preassigned aperture in a panel so that the terminal's flared portion anchors the terminal to the panel whereby each of the components is held on one side of the panel by a plurality of terminals, said terminals extending through the panel providing portions on the other side thereof to which wire-wrapped connections can be made.

4. A method of modifying the leads of components and mounting the components on a panel comprising the steps of continuously feeding a first strip of terminal material through a right hand wrapping tool, continuously feeding a second strip of terminal material through a left hand wrapping tool, feeding each component of a plurality of components, each having at least two leads, to both tools so that the two leads, being gripped by the right hand tool and the left hand tool respectively, are wrapped about a portion of the first strip and a portion of the second strip respectively, forming the strips into a number of terminals so that each component is supported by two terminals, each terminal having a component's lead wrapped about an end portion thereof, and inserting the terminals into preassigned apertures in a panel.

References Cited in the file of this patent

UNITED STATES PATENTS

| | | |
|---|---|---|
| 1,578,667 | Kelsay | Mar. 30, 1926 |
| 2,114,458 | Schafer | Apr. 19, 1938 |
| 2,405,004 | Albiani | July 30, 1946 |
| 2,477,653 | Roane | Aug. 2, 1949 |
| 2,534,867 | Hennessey | Dec. 19, 1950 |
| 2,586,166 | Hilstrom | Feb. 19, 1952 |
| 2,640,903 | Kohring | June 2, 1953 |
| 2,647,990 | Peterson | Aug. 4, 1953 |
| 2,650,415 | Kingman | Sept. 1, 1953 |
| 2,664,486 | Colpitts | Dec. 29, 1953 |
| 2,668,933 | Shapiro | Feb. 9, 1954 |
| 2,703,377 | Hings | Mar. 1, 1955 |
| 2,713,194 | Roach | July 19, 1955 |
| 2,715,764 | Pierce | Aug. 23, 1955 |
| 2,741,436 | Belek | Apr. 10, 1956 |
| 2,744,214 | Marco | May 1, 1956 |
| 2,758,183 | Canegallo | Aug. 7, 1956 |
| 2,778,977 | Lubkin | Jan. 22, 1957 |
| 2,823,360 | Jones | Feb. 11, 1958 |
| 2,823,371 | Jones | Feb. 11, 1958 |
| 2,836,693 | Yarbrough | May 27, 1958 |
| 2,884,210 | Strauss | Apr. 28, 1959 |
| 2,918,640 | Higgs | Dec. 22, 1959 |

FOREIGN PATENTS

| | | |
|---|---|---|
| 223,402 | Great Britain | Oct. 23, 1924 |
| 601,068 | Great Britain | Apr. 27, 1948 |
| 753,445 | Great Britain | July 25, 1956 |
| 1,079,051 | France | Nov. 25, 1954 |